UNITED STATES PATENT OFFICE.

LEONARD ROBERTS COATES, OF BALTIMORE, MARYLAND.

FERTILIZER AND PROCESS OF PRODUCING THE SAME.

1,024,880. Specification of Letters Patent. Patented Apr. 30, 1912.

No Drawing. Application filed August 23, 1911. Serial No. 645,586.

*To all whom it may concern:*

Be it known that I, LEONARD R. COATES, a citizen of the United States, residing at Baltimore, in the State of Maryland, have invented certain new and useful Improvements in Fertilizers and Processes of Producing the Same, of which the following is a specification.

This invention relates to fertilizers and processes of producing the same; and it comprises a fertilizer comprising an intimately commingled mixture of freely available impalpably fine calcium phosphate and another calcium salt of fertilizing value, likewise in a state of impalpable fineness, said mixture being substantially neutral in reaction and character; and it also comprises a process of producing such a fertilizing material wherein intimately commingled calcium phosphate and lime, or lime carbonate, are heated together under such conditions as will, without forming basic phosphates, give a product which will freely slake with water and release or produce an impalpably fine calcium phosphate of freely available nature, such product is slaked, as with water, in such manner as to give a dry pulverulent material and the alkalinity of such material is substantially neutralized with an acid, such as sulfuric acid, which will give lime salts having fertilizing value, the neutralized material thereafter being admixed, if so desired, with other fertilizing materials or used as a substratum for bacterial fertilizers; all as more fully hereinafter set forth and as claimed.

In the manufacture of available phosphatic fertilizers from rock phosphates, apatite, bone, coprolites, etc., it is the custom to acidulate the raw phosphate with sulfuric acid. This acid deprives the phosphoric acid of the natural tricalcium phosphate of all or part of its lime, forming calcium sulfate and soluble acid phosphates or phosphoric acid, as the case may be. These soluble phosphatic materials are freely available in the soil, being readily utilized by plants; which is not the case with the original, or unacidulated, phosphates. Commercial superphosphates generally consist of a mixture of available acid phosphates with the gypsum (calcium sulfate) formed by the reaction of the sulfuric acid with the lime of the phosphate. Occasionally, to produce what are known as double superphosphates, enough sulfuric acid is used to combine with all the lime and so set free all the phosphoric acid, the solution of free phosphoric acid is removed from the gypsum and is used to treat fresh phosphate to convert it into acid phosphate. But ordinarily this is not done.

Acid phosphate is a valuable fertilizer and is useful in connection with nitrogenous fertilizers since both its free acid and its gypsum have the power of holding back ammonia contained in or formed by the decomposition of nitrogenous organic materials. But its acidity is detrimental in most soils; and tends further to restrain the activity of the bacteria which play such an important part in the normal actions going on in the soil which render combined nitrogen available for plants. As stated, unacidulated phosphates are not freely available in the soil; that is, however finely they may be ground, when applied to the soil they are not readily absorbed and utilized by plant roots; they are not "available" in the sense of the art.

In another and prior application (Patent No. 971,830) I have described and claimed a simpler way of making an available phosphate which does not have the objections to acid phosphates. Briefly stated, it consists in taking natural phosphatic materials containing intimately combined or commingled calcium phosphate and calcium carbonate, these two bodies being possibly associated together more or less as a "solid solution," and calcining such materials under conditions which will produce a material readily slaking with water. Under the conditions adopted there is no chemical attack of the lime (produced in calcining) upon the phosphate, such as would produce basic phosphates, but upon slaking with limited amounts of water to produce a dry material, the phosphate is recovered in an impalpably fine form, readily available to plants; resembling in this particular precipitated "unaged" tricalcium phosphate.

As I have now discovered, much the same character of product can be obtained by making intimate artificial commixtures of fine phosphate and fine lime or lime carbonate, and heating together, advantageously rather slowly, in such manner as to form a readily slaking product. The heating should be to, but not much beyond, the calcining temperature of calcium carbonate. While in this modified method the phosphate and the carbonate are not originally in a state of "solid solution" together yet in the calcines with proper operation, this state appears to exist. At all events, with proper heating a calcined product can be obtained which upon slaking with water yields impalpably fine, readily available phosphate from coarser, non-available phosphate. In either method of operation, the lime in the calcines, with proper slaking, itself also becomes a very fine dry powder, intimately commingled with the recovered fine available phosphate.

In working with one typical mixture of calcium carbonate and calcium phosphate, carrying about 26 per cent. of $P_2O_5$, I obtained calcines which could be readily slaked with water to form a powdery product. Of this something like 60 per cent. went through a 250 mesh sieve, another 20 per cent. went through a 125 mesh sieve and the residue remained on the sieve. All these fractions when applied to soil gave results showing the contained $P_2O_5$ to be as available as that in acidulated phosphate, though the $P_2O_5$ of the original material was not available. The first fraction was a little too fine for convenient application in the usual types of fertilizer drills; but its admixture with the second fraction gave a fertilizer readily used in drills. The coarser third fraction required some regrinding. These compositions, consisting essentially of fine slaked lime and fine available phosphate, are eminently suitable for direct application to the soil where some measure of alkalinity in a fertilizer is generally useful; but for admixture with other fertilizers, such as blood, tankage, manure, etc., the alkalinity is sometimes disadvantageous for the reason that it promotes the escape of free ammonia, where ammonia or ammonia salts are contained or formed in the mixture. For this reason in the present process I further modify the described material by substantially neutralizing the free lime present by treatment with an acid forming salts having a fertilizer value. Sulfuric acid is the best for the purpose although the nitrous and nitric acid solutions produced in modern methods of oxidizing aërial nitrogen may also be used. Merely enough acid is employed to neutralize the free lime since it is not necessary, or advantageous, to acidify the phosphate component, which is already in available form. If more than enough acid to combine with the free lime be employed the mixture will be acid in reaction; which is not desirable for reasons before stated.

While fumes of $SO_2$ or water solutions of sulfur dioxid may be used in lieu of sulfuric acid, since sulfites in the soil change to sulfates, yet such use offers no advantage other than somewhat cheapening the operation. And until sulfites are converted into sulfates they somewhat impede fermentations. Nitrous and nitric acids contribute a valuable fertilizer component, available nitrogen, but they tend to make the material somewhat hygroscopic.

A very rich phosphatic fertilizer may be made in a modification of this invention by employing the described solution of phosphoric acid made in the manufacture of "double superphosphate" as the neutralizing agent to saturate the free lime present. This liquid is a solution of phosphoric acid and when applied to the calcines obtained in the described process, its phosphoric acid converts the free lime into an insoluble calcium phosphate of a freely available form, and probably hydrated. The fertilizer thus obtained therefore consists of insoluble calcium phosphate in two forms: the impalpably fine, anhydrous available phosphate obtained in the calcining operation, and the precipitated insoluble calcium phosphate obtained in the neutralization of the free lime. Both are readily available in the soil. As before, the neutralizing liquid should be employed in amount merely sufficient to give a dry powder. If more is employed, the mixture becomes a paste which must afterward be dried; and in this drying the precipitated phosphate may clump together.

If the slaked calcines be carefully neutralized with merely enough dilute acid to unite with the free lime and then dried carefully, the mixture still retains its components in the form of impalpable powders. Without such care in the operation, with sulfuric acid the lime sulfate formed may be in the form of crystals at the beginning of the drying; but this does not affect the impalpable available phosphate. On dehydrating at plaster-making temperatures the gypsum crystals break down and the whole may be readily reduced to a powder of any fineness desired. Dilute sulfuric acid or the other acids stated may be employed in lieu of water in the slaking operation, merely enough acid being used to saturate the free lime and enough water to leave the mixture a dry powder.

The neutral powder obtained as above described may be admixed with any desired potassiferous or nitrogenous fertilizer or with both to obtain complete fertilizers. Its gypsum component, where sulfuric acid is used, in and of itself, has valuable fertilizing properties and is further particularly advantageous in mixtures with nitrogenous materials, such as blood, tankage and the like, since it tends to retain the ammonia without, as in the case of acid phosphates, impeding the fermentations by which the ammonia is formed. The third fraction obtained in sifting the calcined and slacked product is particularly useful for the present purposes.

Instead of admixing the treated available phosphatic material with fertilizers, it may advantageously be admixed with bacterial fertilizers, such as the cultures of nitrogen-gathering bacteria; and indeed may be used as a carrier for them. For this purpose it offers the advantage that being neutral it does not interfere with bacterial growth while sulfate of lime and the available phosphate present both materially facilitate bacterial growth. For this purpose it may be mixed with a little potassiferous material such as potassium sulfate, and, if desired, with nitrogen-free organic material such as tartrates, sugar, etc. Being free of nitrogen when made with sulfuric acid, it is very suitable as an N-free substratum, alone or admixed with potassium and carbon compounds, for the growth of the nitrogen-gathering bacteria.

In a typical embodiment of the present process, I may mix 6 parts of native phosphate, such as Florida or Tennessee phosphate or Canadian apatite with 4 parts of ground limestone. Both may be powdered to pass through a 60 mesh sieve. The admixture should be intimate and thorough. The mixture is then exposed to a calcining heat, say 800° to 900° C. in any suitable apparatus. The mixture may then be slaked with, say $\frac{1}{16}$ parts of 3 per cent. sulfuric acid, which will leave it a dry powder. This powder may be sifted and the finer parts used directly as a fertilizer and the coarser used in admixture with other fertilizers as described. Or the whole slaked mass may be so used. The calcines may be slaked with water and then treated with sulfuric acid as described. Or a suitable rock phosphate carrying calcium carbonate in an intimate admixture or combination with the calcium phosphate, such as certain Tennessee rocks, may be so calcined.

In the calcination of the artificially commingled phosphate and carbonate, any convenient apparatus capable of calcining powders may be used, such as the ordinary rotary kiln employed for cement making. It must however be run at a lower temperature than is customary in making cement. Too high a temperature would overburn the lime and form basic phosphates. In calcining the naturally commingled or combined phosphate and carbonate, the material in lump form may be simply burned in a kiln of the type of an ordinary lime kiln. Care must be taken to preserve the proper range of temperatures.

What I claim is:—

1. As a new fertilizing material, a neutral composition comprising insoluble available calcium phosphate in the form of an impalpable powder and having the characteristics of heated material, intimately commingled with calcium sulfate.

2. As a new fertilizing material, a neutral composition comprising insoluble available calcium phosphate in the form of an impalpable powder and having the characteristics of heated material, intimately commingled with a calcium salt having fertilizing value.

3. The process of making fertilizers which comprises calcining intimately commingled calcium phosphate and calcium carbonate at a temperature and under conditions converting the latter into readily slaking form, and slaking and neutralizing the calcines, neutralization being done with an acid giving salts having fertilizing value.

4. The process of making fertilizers which comprises calcining intimately commingled calcium phosphate and calcium carbonate at a temperature and under conditions converting the latter into readily slaking form, and slaking and neutralizing the calcines, neutralization being performed with sulfuric acid.

5. The process of making fertilizers which comprises calcining intimately commingled calcium phosphate and calcium carbonate at a temperature and under conditions converting the latter into readily slaking form, and slaking and neutralizing the calcines with water containing an acid giving salts having a fertilizing value, merely sufficient liquid being employed to give a dry product.

6. The process of making fertilizers which comprises calcining intimately commingled calcium phosphate and calcium carbonate at a temperature and under conditions converting the latter into a readily slaking form, and slaking and neutralizing the calcines with water containing sulfuric acid, merely sufficient liquid being employed to give a dry product.

7. The process of making fertilizers which comprises intimately commingling fine calcium phosphate and fine calcareous material, calcining the material under conditions giving a readily slaking product and slaking the calcines.

8. The process of making fertilizers which comprises intimately commingling fine calcium phosphate and fine calcareous material, calcining the material under conditions giving a readily slaking product and slaking the calcines with water containing a neutralizing acid in amount sufficient to combine with free lime present.

9. The process of making fertilizers which comprises intimately commingling fine calcium phosphate and fine calcareous material, calcining the material under conditions giving a readily slaking product and slaking the calcines with water containing sulfuric acid in amount sufficient to combine with the free lime present.

In testimony whereof, I affix my signature in the presence of two subscribing witnesses.

LEONARD ROBERTS COATES.

Witnesses:
J. H. THOMAS,
WM. T. HOWARD.